United States Patent
Yun et al.

(10) Patent No.: US 7,636,216 B2
(45) Date of Patent: Dec. 22, 2009

(54) METHOD OF DETERMINING HEAD CHARACTERISTIC OF HDD AND RECORDING MEDIUM TO PERFORM THE SAME

(75) Inventors: Jong-yun Yun, Suwon-si (KR); Joo-hyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 11/769,955

(22) Filed: Jun. 28, 2007

(65) Prior Publication Data
US 2008/0002271 A1  Jan. 3, 2008

(30) Foreign Application Priority Data
Jun. 30, 2006  (KR) .................. 10-2006-0060799

(51) Int. Cl.
*G11B 5/09* (2006.01)
(52) U.S. Cl. ........................................ 360/53
(58) Field of Classification Search .............. 360/53, 360/31, 75, 97.01
See application file for complete search history.

(56) References Cited

U.S. PATENT DOCUMENTS

| | | | | |
|---|---|---|---|---|
| 7,027,242 | B1 * | 4/2006 | Terrill et al. | 360/31 |
| 7,230,780 | B2 * | 6/2007 | Suk | 360/31 |
| 7,423,832 | B2 * | 9/2008 | Buch et al. | 360/75 |
| 7,486,465 | B2 * | 2/2009 | Kondo | 360/75 |
| 7,489,461 | B2 * | 2/2009 | Yun et al. | 360/31 |
| 2005/0094300 | A1 * | 5/2005 | Yano et al. | 360/31 |

(Continued)

FOREIGN PATENT DOCUMENTS

JP  2001-273603  10/2001

(Continued)

OTHER PUBLICATIONS

Korean Office Action dated Jun. 21, 2007 issued in KR 2006-60799.

*Primary Examiner*—Fred Tzeng
(74) *Attorney, Agent, or Firm*—Stanzione & Kim LLP

(57) ABSTRACT

A method of determining a head characteristic, i.e. determining whether a head has a write characteristic stronger or weaker than that of a normal write head, and a recording medium suitable to perform the method. The method includes detecting a first error rate by writing data and then reading the written data without control pole tip protrusion (PTP) contralto compensate for thermal pole tip protrusion (TPTP) in a state where the head is fully cooled, detecting a second error rate by writing data and then reading the written data with the PTP control in the state where the head is fully cooled, calculating a difference between the first error rate and the second error rate, and determining based on the calculated error rate difference whether the head is a strong write head having a stronger write characteristic than that of the normal write head or a weak write head having a weaker write characteristic than that of the normal write head. Accordingly, since an adjacent track write (ATW) problem, which may occur due to a narrow gap between adjacent tracks, and a weak write problem, which may occur due to a short media recording length per data bit, can be simultaneously considered, high reliability can be secured in terms of recording and reproducing in an HDD.

18 Claims, 6 Drawing Sheets

U.S. PATENT DOCUMENTS

| | | |
|---|---|---|
| 2006/0001994 A1 | 1/2006 | Williams |
| 2007/0230001 A1 * | 10/2007 | Imamura et al. .............. 360/31 |
| 2007/0263309 A1 * | 11/2007 | Lee et al. ..................... 360/31 |

FOREIGN PATENT DOCUMENTS

| | | |
|---|---|---|
| KR | 2005-28388 | 3/2005 |
| KR | 2005-28712 | 3/2005 |
| KR | 2005-34192 | 4/2005 |

* cited by examiner

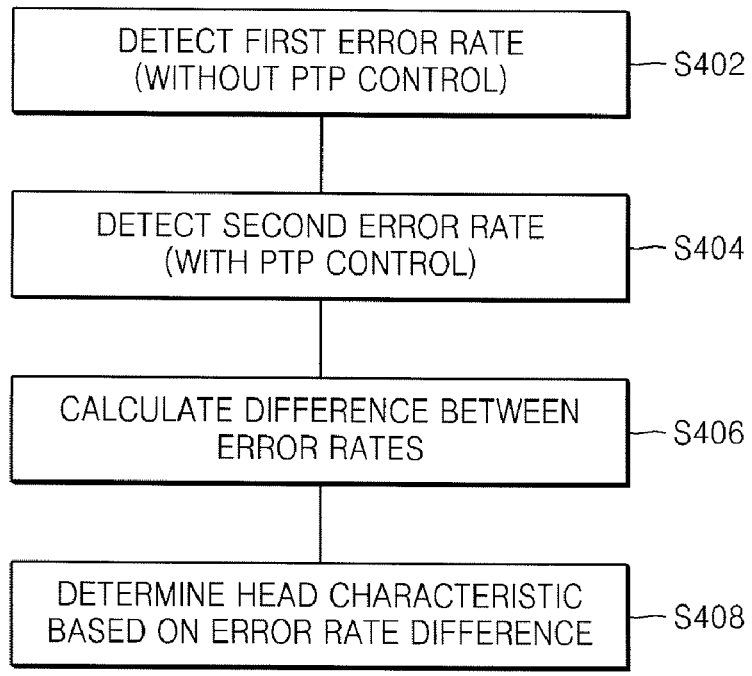
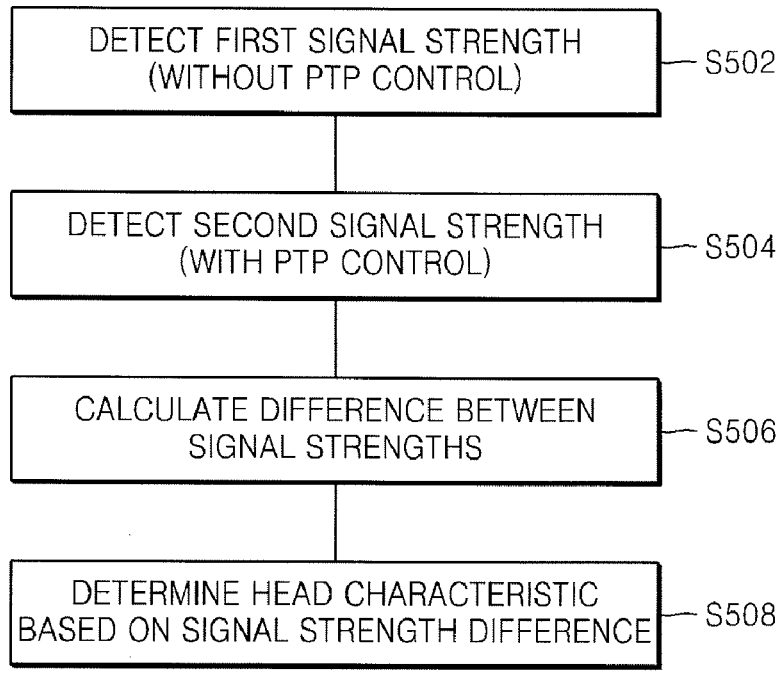

METHOD OF DETERMINING HEAD CHARACTERISTIC OF HDD AND RECORDING MEDIUM TO PERFORM THE SAME

CROSS-REFERENCE TO RELATED APPLICATIONS

This application claims priority from Korean Patent Application No. 10-2006-0060799, filed on Jun. 30, 2006, in the Korean Intellectual Property Office, the disclosure of which is incorporated herein in its entirety by reference.

BACKGROUND OF THE INVENTION

1. Field of the Invention

The present general inventive concept relates to a hard disk drive (HDD), a control apparatus of an HDD, and more particularly, to a method of determining a head characteristic, i.e. determining whether a head has a stronger or weaker write characteristic than that of a normal write head, and a recording medium to perform the method.

2. Description of the Related Art

In an HDD, a data write characteristic of a disk differs according to a head characteristic. Heads of an HDD are classified into heads which record data more strongly on media (strong write heads) and heads which record data more weakly on media (weak write heads) based on a mean characteristic of a group of heads. Thus, a write current needs to be determined according to the head characteristic. That is, a write current lower than a default value must be applied to the strong write heads in order to prevent interference with adjacent tracks, and a write current higher than the default value must be applied to the weak write heads in order to write data in a normal manner.

In order to increase recording capacity of HDDs, track per inch (TPI) and bit per inch (BPI) levels have been increased. However, an increase of TPI causes a higher occurrence of a probability of interference between adjacent tracks. In particular, a strong write head may erase data recorded in an adjacent track due to interference.

On the contrary, an increase of BPI may cause a decrease in recording length on the media per data bit, resulting in a decrease in the amount of magnetization. In particular, a weak write head may not normally write data due to the decrease in the amount of magnetization, causing normal data reproduction to be impossible.

In the prior art, without considering these problems, a write current is set based on a write head having a characteristic determined as being the same for all write heads and applied to all HDDs. Thus, if a write current is set to write data more strongly by considering a weak write characteristic, when a strong write head exists, the strong write head with the strong write current may erase an adjacent track.

On the contrary, if a write current is set to write data more weakly by considering a strong write characteristic, when a weak write head exists, the weak write head with the weak write current may not write data in a normal manner.

FIGS. 1A through 1C are graphs illustrating the effects of a normal write head, a strong write head, and a weak write head, respectively. The graphs illustrated in FIGS. 1A through 1C are obtained by applying a write current suitable for the normal write head to the normal write head, the strong write head, and the weak write head, repeatedly writing data in an $N^{th}$ track, and measuring error rates of data read from the $N^{th}$ track and adjacent tracks. In FIGS. 1A through 1C, N denotes a track number, and BER (bit error rate) denotes an error rate.

Referring to FIGS. 1A and 1B, compared to the normal write head, the strong write head has a lower error rate in the $N^{th}$ track and a higher error rate in the adjacent tracks. Referring to FIGS. 1A and 1C, compared to the normal write head, the weak write head has a higher error rate in the $N^{th}$ track.

Although the strong write head has a lower error rate in the $N^{th}$ track than that of the normal write head due to the strong write characteristic, since data recorded in the adjacent tracks is erased, an error rate in the adjacent tracks is higher. The weak write head has a higher error rate in the $N^{th}$ track than that of the normal write head since data is not recorded in a normal manner.

Thus, to apply an optimal write current to heads, a method of determining whether a head is a normal write head, a strong write head, or a weak write head is needed.

SUMMARY OF THE INVENTION

The present general inventive concept provides a method of determining a head characteristic, i.e., determining whether a head is a normal write head, a strong write head, or a weak write head.

The present general inventive concept also provides a computer readable recording medium to store a computer readable program to execute the method of determining a head characteristic.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of determining a head characteristic, i.e., determining whether a head is a strong write head having a stronger write characteristic than that of a normal write head or a weak write head having a weaker write characteristic than that of the normal write head, the method including detecting a first error rate by writing data and then reading the written data without control pole tip protrusion (PTP) control to compensate for thermal pole tip protrusion (TPTP) in a state where the head is fully cooled, detecting a second error rate by writing data and then reading the written data with the PTP control in the state where the head is fully cooled, calculating a difference between the first error rate and the second error rate, and determining based on the calculated error rate difference whether the head is the strong write head or the weak write head.

In the detecting of the first error rate and the detecting of the second error rate, the data may be written by applying a write current lower than a default write current by an amount M.

The default write current may be set based on an operation temperature of a hard disk drive (HDD).

The foregoing and/or other aspects and utilities of the present general inventive concept may also be achieved by providing a computer readable recording medium storing a computer readable program for executing a method of determining a head characteristic, the method including detecting a first error rate by writing data by applying a write current lower than a default write current by an amount M to a head without PTP control in a state where the head is fully cooled and then reading the written data, detecting a second error rate by writing data by applying the write current lower than the default write current by an amount M to the head with the PTP control in the state where the head is fully cooled and then reading the written data, calculating a difference between the first error rate and the second error rate, and determining based on the calculated error rate difference whether the head is a strong write head having a stronger write characteristic than that of a normal write head or a weak write head having a weaker write characteristic than that of the normal write head.

The foregoing and/or other aspects and utilities of the present general inventive concept may also be achieved by providing a method of determining a head characteristic, the method including detecting a first error rate by writing data and reading the written data without performing pole tip protrusion control, detecting a second error rate by writing data and reading the written data by performing pole tip protrusion control, and determining whether the head has a strong write head characteristic or a weak write head characteristic based on a comparison between the first and second error rate.

The foregoing and/or other aspects and utilities of the present general inventive concept may also be achieved by providing a computer readable recording medium to store a computer readable program to execute a method of determining a head characteristic, the method including detecting a first error rate by writing data and reading the written data without performing pole tip protrusion control, detecting a second error rate by writing data and reading the written data by performing pole tip protrusion control, and determining whether the head has a strong write head characteristic or a weak write head characteristic based on a comparison between the first and second error rate.

The foregoing and/or other aspects and utilities of the present general inventive concept may also be achieved by providing an apparatus to control a head unit of a hard disk drive (HDD), including a head unit to read data from and write data to a disk with read and write currents, a temperature sensor to sense an operation temperature of the HDD, and a control unit to set a default write current based on the sensed operation temperature, to determine a head unit characteristic, and to compensate the write current according to the determined head unit characteristic, wherein the head unit characteristic is determined by comparing results of writing and reading data when the head unit is fully cooled in a case using a pole tip protrusion (PTP) control to a case not using the PTP control and the results are obtained by writing with a write current which is less than the default write current by a predetermined differential amount.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 4 is a flowchart illustrating a method of determining a head characteristic according to an embodiment of the present general inventive concept;

FIG. 5 is a flowchart illustrating a method of determining a head characteristic using an overwrite characteristic according to another embodiment of the present general inventive concept;

DETAILED DESCRIPTION OF THE PREFERRED EMBODIMENTS

Figure 1A:
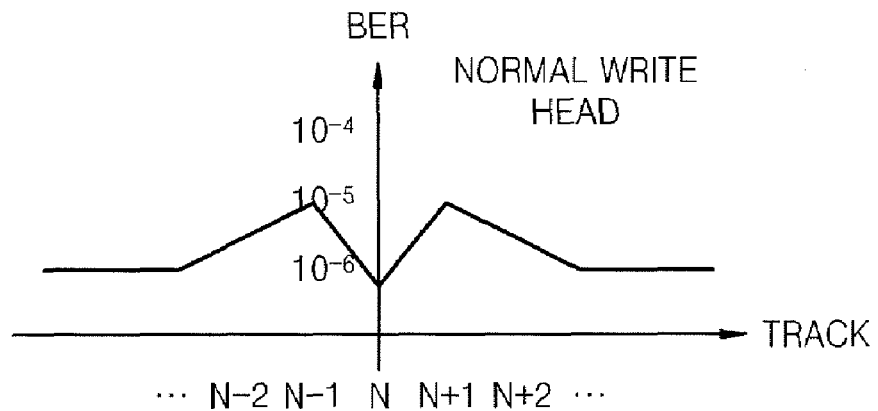
FIGS. 1A through 1C are graphs illustrating the effects of a normal write head, a strong write head, and a weak write head, respectively.
Figure 1B:
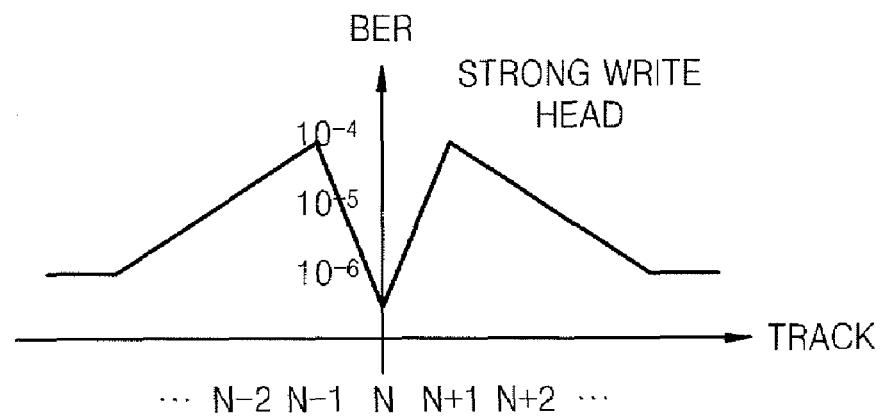
Figure 1C:
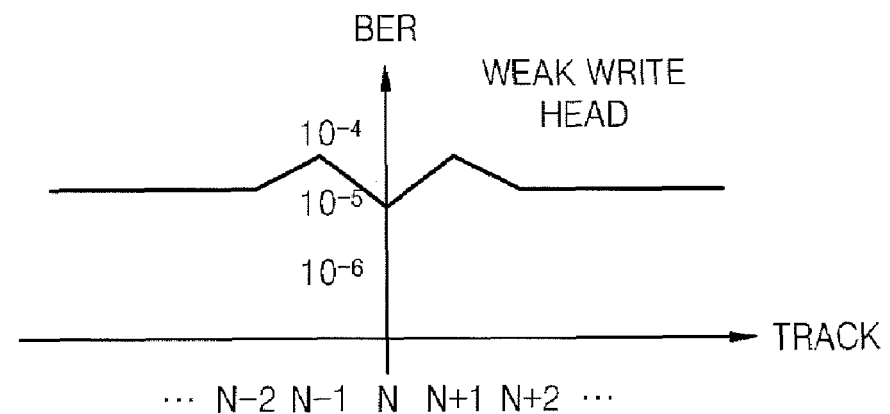

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

In currently used HDDs, a metal (generally, permalloy; Ni 80%/Fe 20%) is used for a magnetic write head, and a non-metal is used for a slider to support the head.

Thus, in a write operation, a write current flows through a metallic coil, causing Joule heat. Herein, a portion around a pole protrudes due to a difference between coefficients of thermal expansion of the metal and the nonmetal, called thermal pole tip protrusion (TPTP).

In a write operation of an HDD, in an initial time, a portion around a pole does not protrude since a write head has not been heated. However, the write head is heated according to an elapse of a write time, causing the portion around the pole to protrude.

Once the write head is fully heated, i.e., after TPTP is saturated, data can be written based on a default write current. However, in an initial write operation in which the write head has not been fully heated, data is written by applying a write current higher than the default write current to the write head considering the effect of TPTP until the TPTP is saturated, and this is called pole tip protrusion (PTP) control.

A section in which the PTP control (PTP control section) is performed can be defined as a sector length from when a write operation starts to when the TPTP is saturated, and the PTP control section can differ according to different heads, e.g., around 10 cm for a weak write head.

A bit error rate (BER) of data reproduction in the PTP control section is high when data is written by a weak write head and low when data is written by a strong write head.

The weak write head has a weak write characteristic, and a magnetizing force in the PTP control section is lower as compared to other sections even though the magnetizing force is compensated for by the PTP control, and thus it is understandable that a BER of data reproduction in the PTP control section is high. The strong write head has a strong write characteristic, and thus it is understandable that a BER of data reproduction is sufficiently low even in the PTP control section. Accordingly, a head characteristic can be determined by comparing error rates in the PTP control section.

In an embodiment of the present general inventive concept, a head characteristic is determined using error rate comparison. That is, the head characteristic is determined by comparing a first error rate obtained when data is written while performing the PTP control in the PTP control section to a second error rate obtained when data is written while not performing the PTP control in the PTP control section.

In addition, in the present general inventive concept, discrimination of a strong write head with respect to a weak write head is higher by applying a write current lower than the default write current to the head.

Figure 2A:
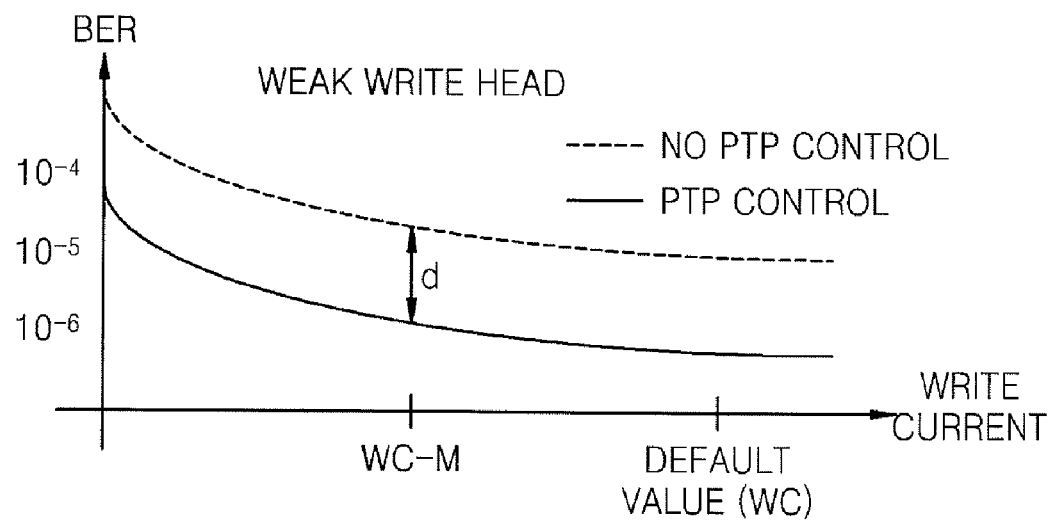
FIGS. 2A and 2B are graphs illustrating a variation of a bit error rate (BER) according to a magnitude of a write current in a section in which pole tip protrusion (PTP) control is performed.
Figure 2B:
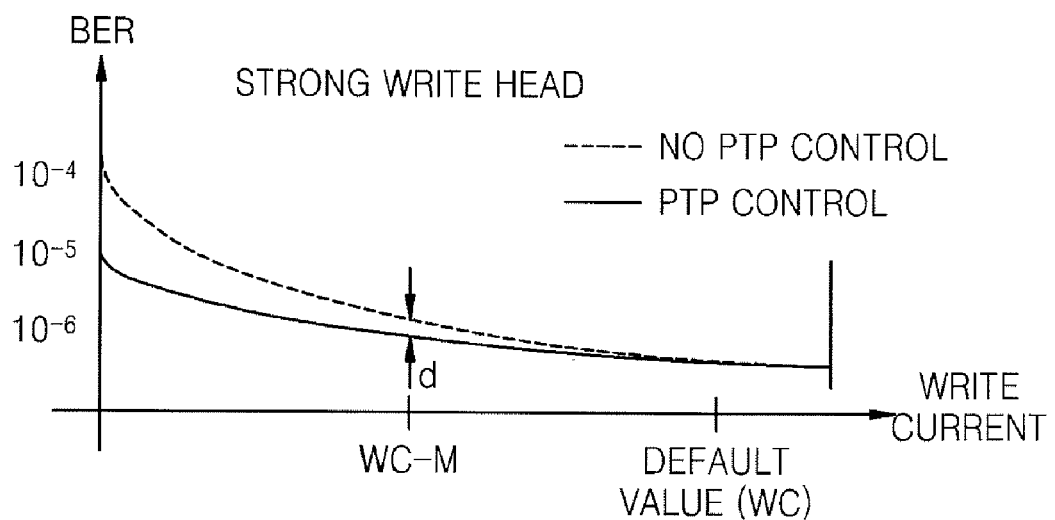

FIGS. 2A and 2B are graphs illustrating a variation in BER according to a magnitude of a write current in the PTP control section. The graphs in FIGS. 2A and 2B illustrate results obtained by writing data while changing the magnitude of the write current and then detecting error rates by reading the written data. In FIGS. 2A and 2B, a default write current $W_c$ indicates the magnitude of a write current obtained considering an operation temperature of an HDD, and M denotes a value subtracted from the default write current $W_c$ to make a worst-case write environment.

In an embodiment of the present general inventive concept, the write current is a current applied to a recording head and includes a direct current (DC) component, an overshoot current (OSC), and an overshoot duration (OSD). In addition, M is applied to each of the DC component, the OSC, and the OSD and likewise decreases the DC component, the OSC, and the OSD.

FIG. 2A illustrates a case of a weak write head, and FIG. 2B illustrates a case of a strong write head. In FIGS. 2A and 2B, a solid line corresponds to a case where the PTP control is performed, and a dotted line corresponds to a case where the PTP control is not performed.

Referring to FIG. 2A, there is a large difference d between an error rate of a case where the PTP control is performed for the weak write head and an error rate of a case where the PTP control is not performed for the weak write head. Referring to FIG. 2B, there is a significantly smaller difference d between an error rate of a case where the PTP control is performed for the strong write head and an error rate of a case where the PTP control is not performed for the strong write head, than that in the case of the weak write head.

Referring to FIG. 2B, the error rate difference d in the case of the strong write head is smaller when the magnitude of the write current is closer to the default write current $W_c$. Thus, in order to increase a power of discrimination of the strong write head from the weak write head, it is advantageous that the write current is set to be significantly smaller than the default write current $W_c$, and this is the reason for subtracting M from the default write current $W_c$.

Figure 3A:
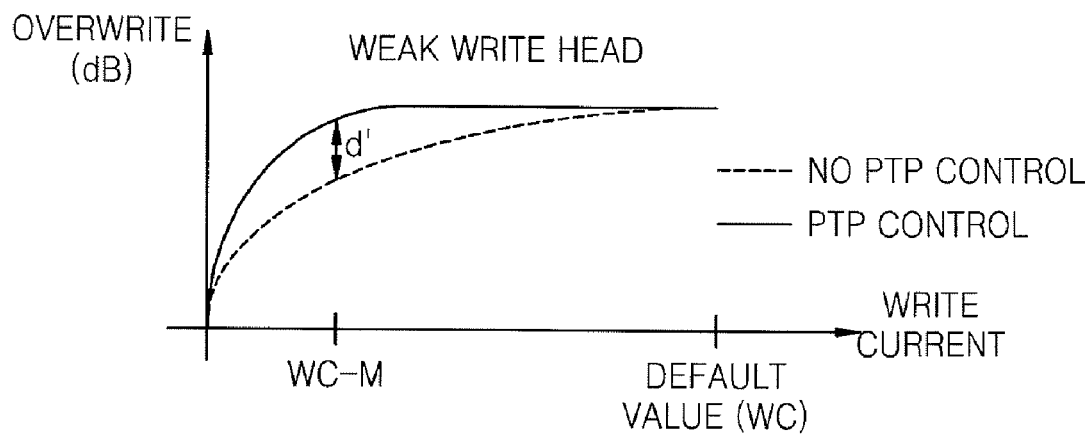
FIGS. 3A and 3B are graphs illustrating an overwrite characteristic according to a magnitude of a write current in a section in which PTP control is performed.
Figure 3B:
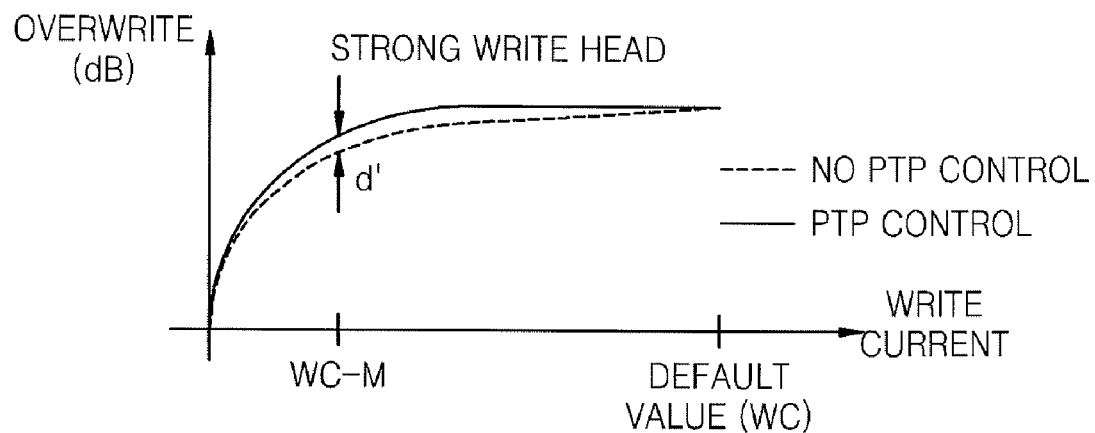

FIGS. 3A and 3B are graphs illustrating an overwrite characteristic according to the magnitude of a write current in the PTP control section. The overwrite characteristic is obtained by repeatedly writing data in the same location and detecting a signal strength of the written data. The graphs in FIGS. 3A and 3B illustrate results obtained by repeatedly writing data in the same location a predetermined number of times in the PTP control section while changing the magnitude of a write current and then detecting signal strengths by reading the written data.

FIG. 3A illustrates a case of a weak write head, and FIG. 3B illustrates a case of a strong write head. In FIGS. 3A and 3B, a solid line corresponds to a case where the PTP control is performed, and a dotted line corresponds to a case where the PTP control is not performed.

Referring to FIG. 3A, a signal strength of the weak write head continuously increases while increasing the write current and is saturated when the write current is high. Referring to FIG. 3B, a signal strength of the strong write head is quickly saturated even when the write current is low.

Referring to FIG. 3A, there is a large difference d' between a signal strength of a case where the PTP control is performed for the weak write head and a signal strength of a case where the PTP control is not performed for the weak write head.

Referring to FIG. 3B, there is a significantly smaller difference d' between a signal strength of a case where the PTP control is performed for the strong write head and a signal strength of a case where the PTP control is not performed for the strong write head, than that in the case of the weak write head.

Referring to FIG. 3B, the signal strength difference d' in the case of the strong write head is smaller when the magnitude of the write current is closer to the default write current $W_c$. Thus, in order to increase a power of discrimination of the strong write head from the weak write head, it is advantageous that the write current is set to be significantly smaller than the default write current $W_c$.

FIG. 4 is a flowchart illustrating a method of determining a head characteristic according to an embodiment of the present general inventive concept.

Referring to FIG. 4, a first error rate is detected in operation S402 by writing data by applying a write current, which is lower than the default write current $W_c$ by an amount M, to a head without the PTP control in a state where the head is fully cooled and then reading the written data.

The state where the head is fully cooled is a state where TPTP does not occur. In an HDD, a head is heated only when the write current is applied to the head, and if the write current is not applied to the head, the head is quickly cooled due to an air flow generated by disk rotation of the HDD.

A length of a section in which the data is written corresponds to a time from when the recording starts to when TPTP is saturated, and the section is around 10 cm in the case of a weak write head. The length of the section in which the data is written may be set based on the weak write head instead of a strong write head.

The differential amount M is determined through experimental data, based on the fact that the data is well written using the strong write head and incorrectly written using the weak write head.

A second error rate is detected in operation S404 by writing data by applying the write current, which is lower than the default write current $W_c$ by the amount M, to the head with the PTP control in a state where the head is fully cooled again and then reading the written data.

Herein, the PTP control value is set to a value as large as possible so that the data is well written even when using the weak write head.

A difference d between the first error rate and the second error rate is calculated in operation S406.

It is determined, based on the error rate difference d in operation S408, whether the head is a strong write head or a weak write head. Referring to FIGS. 2A and 2B, if the error rate difference d is large, it is determined that the head is the weak write head, and if the error rate difference d is small, it is determined that the head is the strong write head.

A magnitude of the error rate difference d to determine whether the head is the strong write head or the weak write head may be set based on experimental data.

FIG. 5 is a flowchart illustrating a method of determining a head characteristic using the overwrite characteristic according to another embodiment of the present general inventive concept.

Referring to FIG. 5, a first signal strength is detected in operation S502 by repeatedly writing data in a same location a predetermined number of times by applying a write current, which is lower than the default write current $W_c$ by an amount M, to a head without the PTP control in a state where the head is fully cooled and then reading the written data.

A second signal strength is detected in operation S504 by repeatedly writing data in a same location a predetermined number of times by applying the write current, which is lower than the default write current $W_c$ by the amount M, to the head with the PTP control in a state where the head is fully cooled again and then reading the written data.

A difference d' between the first signal strength and the second signal strength is calculated in operation S506.

It is determined, based on the signal strength difference d' in operation S508, whether the head is a strong write head or a weak write head. Referring to FIGS. 3A and 3B, if the signal strength difference d' is large, it is determined that the head is the weak write head, and if the signal strength difference d' is small, it is determined that the head is the strong write head.

The magnitude of the signal strength difference d' to determine whether the head is the strong write head or the weak write head may be set based on experimental data.

Figure 6:
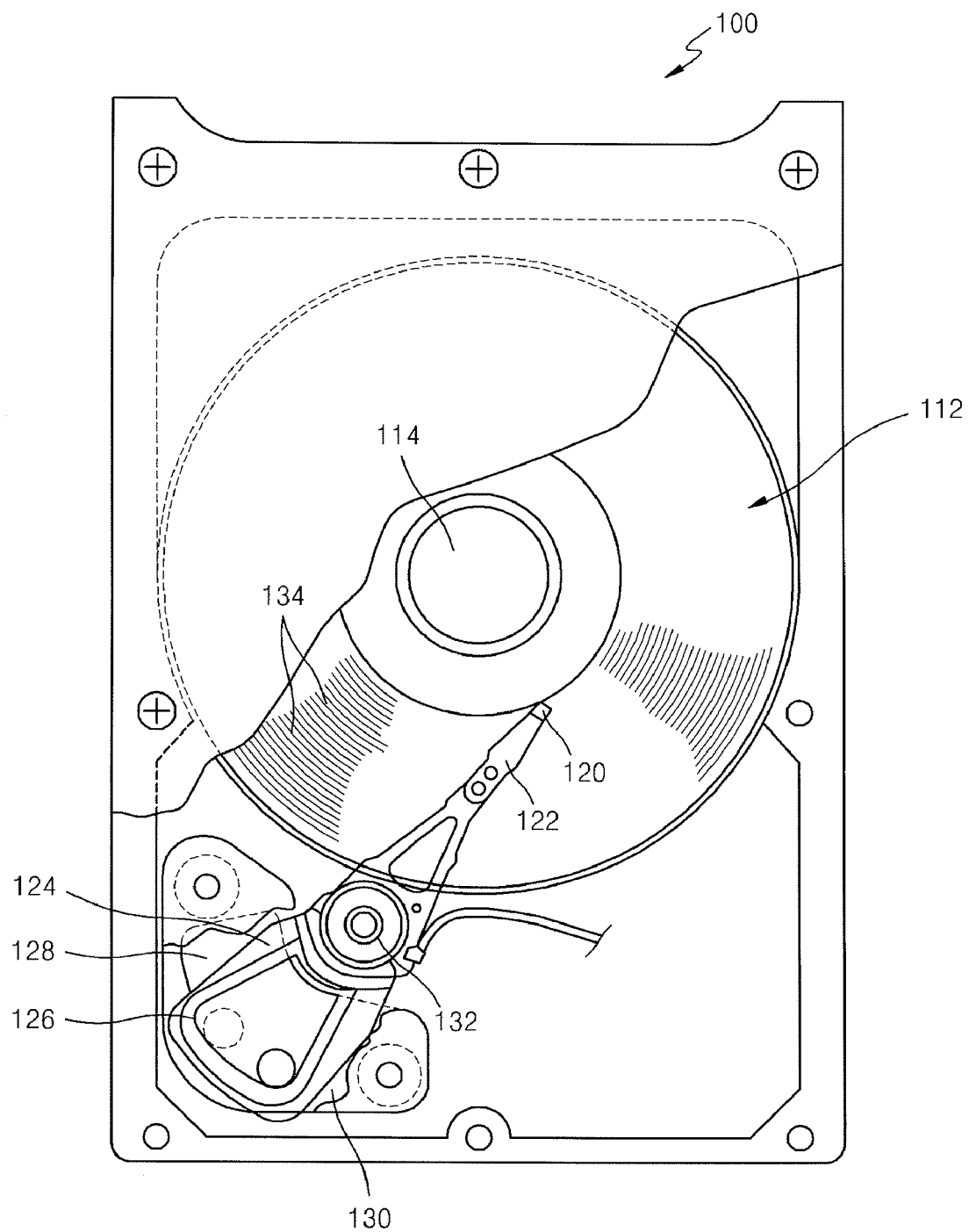
FIG. 6 is a schematic plan view illustrating an HDD to which the present general inventive concept is applied.

FIG. 6 is a schematic plan view illustrating an HDD 100 to which the present general inventive concept is applied.

Referring to FIG. 6, the HDD 100 includes at least one disk 112 rotated by a spindle motor 114. The HDD 100 also includes a head 120 located above a surface of the disk 112.

The head 120 can read or write information from or to the rotating disk 112 by sensing a magnetic field on the surface of the disk 112 or magnetizing the surface of the disk 112, respectively. Though a single head 16 is described, the head 16 includes a write head for magnetizing the disk 112 and a separate read head to sense a magnetic field of the disk 112.

An air bearing is generated between the head 120 and the surface of the disk 112 due to the structure of the head 120. The head 120 is combined with a head stack assembly (HSA) 122. The HSA 122 is attached to an actuator arm 124 having a voice coil 126. The voice coil 126 is located adjacent to a magnetic assembly 128 to support a voice coil motor (VCM) 130. A current supplied to the voice coil 126 generates a torque which rotates the actuator arm 124 around a bearing assembly 132. The rotation of the actuator arm 124 moves the head 120 across the surface of the disk 112.

Information is stored in concentric tracks of the disk 112. In general, the disk 112 includes a data zone in which user data is recorded, a parking zone in which the head 120 is retracted when the HDD 100 is not used, and a maintenance cylinder. The maintenance cylinder is used to store compensation values at a high temperature and a low temperature, which are used to obtain a default write current $W_c$, a control value for PTP control, a value M, the differences d and d' used to determine a characteristic of the head 120, the head characteristic, and write current compensation values according to the head characteristic. The head characteristic is determined using the method illustrated in FIG. 4 or 5, and the result is recorded in the maintenance cylinder.

Figure 7:
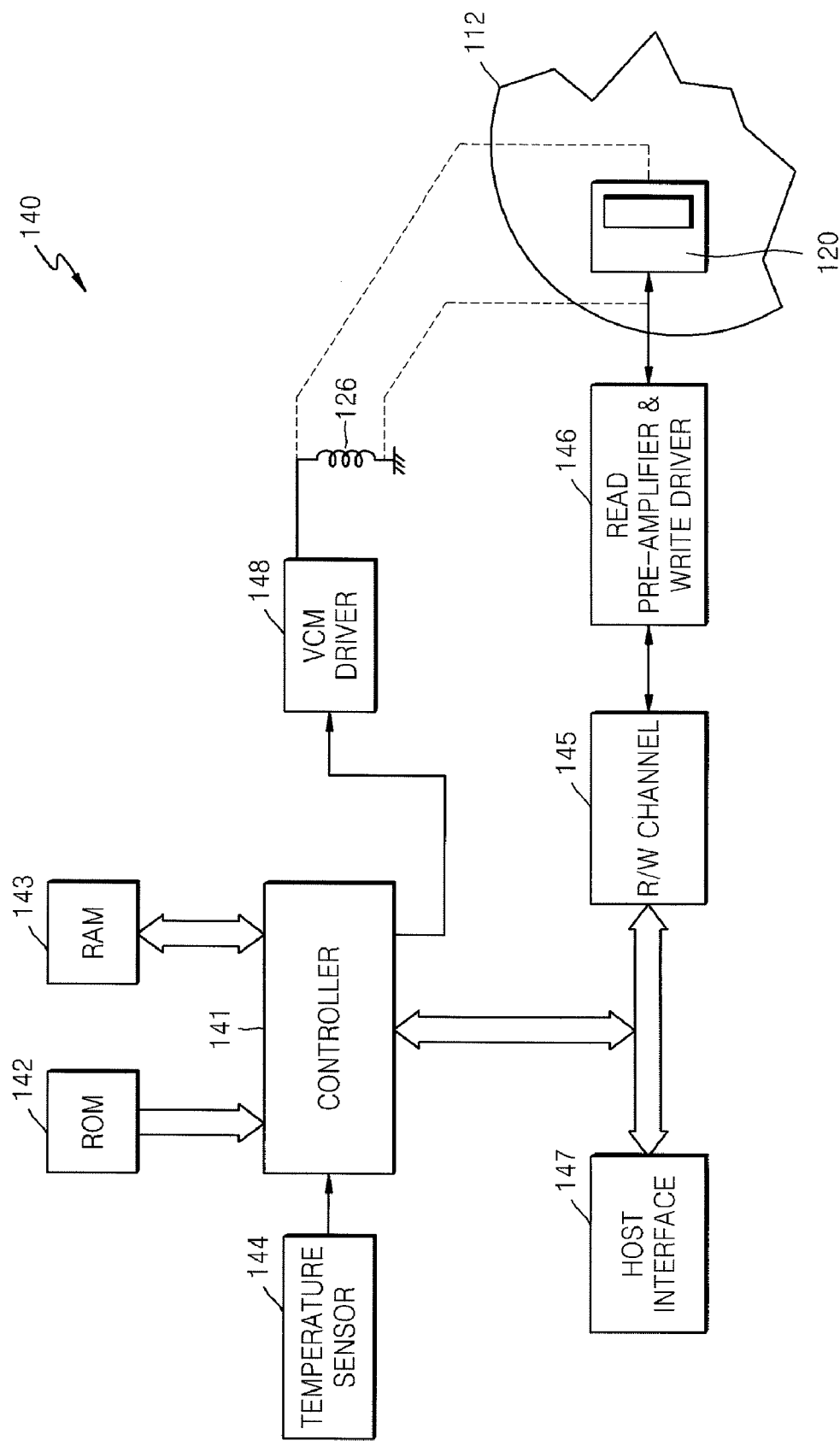
FIG. 7 is a block diagram illustrating a control apparatus of the HDD illustrated in FIG. 6, according to an embodiment of the present general inventive concept.

FIG. 7 is a block diagram illustrating a control apparatus 140 for the HDD 100 illustrated in FIG. 6, according to an embodiment of the present general inventive concept.

Referring to FIG. 7, the control apparatus 140 includes a controller 141 connected to the head 120 through a read/write (R/W) channel 145 and a read pre-amplifier & write driver 146. The controller 141 may be a digital signal processor (DSP), a microprocessor, or a micro-controller.

The controller 141 provides a control signal to the R/W channel 145 to read or write data from or to the disk 112, and in particular, controls a write current according to a temperature sensed by a temperature sensor 144.

Information is typically transmitted from the R/W channel 145 to a host interface 147. The host interface 147 includes a control circuit (not illustrated) to interface with a system (not illustrated) such as a personal computer (PC).

The R/W channel 145 modulates an analog signal read by the head 120 and amplified by the read pre-amplifier & write driver 146 into a host computer-readable digital signal and outputs the digital signal to the host interface 147, and the R/W channel 145 converts user data received from a host computer (not illustrated) via the host interface 147 into a disk-recordable write current and outputs the write current to the read pre-amplifier & write driver 146.

The controller 141 is also connected to a VCM driver 148 to supply a driving current to the voice coil 126. The controller 141 provides a control signal to the VCM driver 148 to control the activation of the VCM 130 and the motion of the head 120.

The controller 141 is also connected to a read only memory (ROM) 142 and a random access memory (RAM) 143. The memories 142 and 143 store instructions and data, which are used by the controller 141 to execute software routines.

The software routines include a seek routine to move the head 120 from one track to another and a following routine to seek a target sector in a target track. The seek routine includes a servo control routine to guarantee that the head 120 is correctly moved to the target track.

The memories 142 and 143 may also store programs to execute the method of determining a head characteristic, which is illustrated in FIG. 4 or 5.

When the HDD 100 performs a head determination operation, the controller 141 sets the default write current $W_c$ based on an operation temperature sensed by the temperature sensor 144.

The controller 141 determines a characteristic of the head 120 using the default write current $W_c$, the value of a differential amount M, and a PTP control value.

For example, the controller 141 detects the first error rate by writing data by applying a write current, which is lower than the default write current $W_c$ by the amount M, to the head 120 without PTP control in a state where the head 120 is fully cooled and then reading the written data.

The controller 141 detects the second error rate by writing data by applying a write current, which is lower than the default write current $W_c$ by the amount M, to the head 120 with PTP control in a state where the head 120 is fully cooled again and then reading the written data.

The controller 141 calculates the difference d between the first error rate and the second error rate and determines whether the head 120 is a strong write head or a weak write head, based on the error rate difference d.

The controller 141 records the determination result in the maintenance cylinder, and thereafter, the controller 141 controls the write current by referring to the head characteristic and write current compensation values according to the head characteristic.

Although an operation of the controller 141 determining the head characteristic using the error rate difference d has been described, since an operation of the controller 141 determining the head characteristic using the signal strength difference d' according to the overwrite characteristic is similar to the above description, a detailed description thereof is omitted.

As described above, according to the present general inventive concept, by comparing an error rate obtained by writing data without PTP control to an error rate obtained by writing data with the PTP control, in a state where a write current is sufficiently lower than a default write current, a head characteristic, i.e., whether a head is a strong write head or a weak write head, can be correctly determined.

A method of determining a head characteristic can prevent a write error by determining the head characteristic and compensating for a write current accordingly.

Since an adjacent track write (ATW) problem, which may occur due to a narrow gap between adjacent tracks, and a weak write problem, which may occur due to a short recording length on media per data bit, can be simultaneously considered, high reliability can be secured in a recording and reproducing performed in a hard disk drive.

The present general inventive concept can also be embodied as computer-readable codes on a computer-readable recording medium. The computer-readable recording medium may be any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains. The methods illustrated in FIGS. 4 and/or 5 can be stored in the computer-recorded medium in a form of computer-readable codes to perform the method when the computer reads the computer-readable codes of the recording medium.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of determining a head characteristic of whether a head is a strong write head having a stronger write characteristic than a normal write head or a weak write head having a weaker write characteristic than the normal write head, the method comprising:
   detecting a first error rate by writing data and then reading the written data without pole tip protrusion (PTP) control to compensate for thermal pole tip protrusion (TPTP) in a state where the head is fully cooled;
   detecting a second error rate by writing data and then reading the written data with the PTP control in the state where the head is fully cooled;
   calculating a difference between the first error rate and the second error rate; and
   determining based on the calculated error rate difference whether the head is the strong write head or the weak write head.

2. The method of claim 1, wherein in the detecting of the first error rate and the detecting of the second error rate, the data is written by applying a write current lower than a default write current by an amount M.

3. The method of claim 2, wherein the default write current is set based on an operation temperature of a hard disk drive (HDD).

4. The method of claim 2, further comprising:
   detecting a first signal strength by repeatedly writing data in a same location a predetermined number of times by applying the write current lower than the default write current by an amount M to the head without the PTP control in a state where the head is fully cooled and then reading the data;
   detecting a second signal strength by repeatedly writing data in a same location a predetermined number of times by applying the write current lower than the default write current by an amount M to the head with the PTP control in the state where the head is fully cooled again and then reading the data;
   calculating a difference between the first signal strength and the second signal strength; and
   determining based on the calculated signal strength difference whether the head is the strong write head or the weak write head.

5. A computer readable recording medium to store a computer readable program to execute a method of determining a head characteristic, the method comprising:
   detecting a first error rate by writing data by applying a write current lower than a default write current by an amount M to a head without pole tip protrusion (PTP) control to compensate for thermal pole tip protrusion (TPTP) in a state where the head is fully cooled and then reading the written data;
   detecting a second error rate by writing data by applying the write current lower than the default write current by the amount M to the head with the PTP control in the state where the head is fully cooled and then reading the written data;
   calculating a difference between the first error rate and the second error rate; and
   determining based on the calculated error rate difference whether the head is a strong write head having a stronger write characteristic than a normal write head or a weak write head having a weaker write characteristic than the normal write head.

6. The recording medium of claim 5, wherein in the detecting of the first error rate and the detecting of the second error rate, the data is written by applying a write current lower than a default write current by the amount M.

7. The recording medium of claim 6, wherein the default write current is set based on an operation temperature of a hard disk drive (HDD).

8. The recording medium of claim 6, wherein the method further comprises:
   detecting a first signal strength by repeatedly writing data in a same location a predetermined number of times by applying the write current lower than the default write current by the amount M to the head without the PTP control in the state where the head is fully cooled and then reading the data;
   detecting a second signal strength by repeatedly writing data in a same location a predetermined number of times by applying the write current lower than the default write current by the amount M to the head with the PTP control in the state where the head is fully cooled again and then reading the data;
   calculating a difference between the first signal strength and the second signal strength; and
   determining based on the calculated signal strength difference whether the head is the strong write head or the weak write head.

9. A method of determining a head characteristic, the method comprising:
   detecting a first error rate by writing data and reading the written data without performing pole tip protrusion control;
   detecting a second error rate by writing data and reading the written data by performing pole tip protrusion control; and
   determining whether the head has a strong write head characteristic or a weak write head characteristic based on a comparison between the first and second error rates.

10. The method of claim 9, wherein the comparison between the first and second error rates comprises calculating a difference between the first and second error rates.

11. The method of claim 9, further comprising:
compensating a write current in a write operation of the HDD in accordance with the determined head characteristic.

12. A computer readable recording medium to store a computer readable program to execute a method of determining a head characteristic, the method comprising:
detecting a first error rate by writing data and reading the written data without performing pole tip protrusion control;
detecting a second error rate by writing data and reading the written data by performing pole tip protrusion control; and
determining whether the head has a strong write head characteristic or a weak write head characteristic based on a comparison between the first and second error rates.

13. An apparatus to control a head unit of a hard disk drive (HDD), comprising:
a head unit to read data from and write data to a disk with read and write currents;
a temperature sensor to sense an operation temperature of the HDD; and
a control unit to set a default write current based on the sensed operation temperature, to determine a head unit characteristic, and to compensate the write current according to the determined head unit characteristic,
wherein the head unit characteristic is determined by comparing results of writing and reading data when the head unit is fully cooled in a case using a pole tip protrusion (PTP) control to a case not using the PTP control and the results are obtained by writing with a write current which is less than the default write current by a predetermined differential amount.

14. The apparatus of claim 13, wherein the control unit comprises one of a digital signal processor (DSP), a microprocessor, or a microcontroller.

15. The apparatus of claim 13, wherein the compared results are a first signal strength value of writing and reading data without a PTP control and a second signal strength value of writing and reading data using the PTP control.

16. The apparatus of claim 13, wherein the compared results are a first error rate value of writing and reading data without a PTP control and a second error rate value of writing and reading data using the PTP control.

17. The apparatus of claim 13, wherein the HDD further comprises:
a voice coil to rotate an actuator arm to move the head unit in accordance with a control signal received from the control unit; and
a voice coil motor driver to drive the voice coil.

18. The apparatus of claim 13, wherein the HDD further comprises:
a pre-amplifier unit to convert read and write signals from the head unit to a analog signals; and
a read/write channel to convert user data from the host into a disk-recordable write current and to modulate the analog signals into host computer-readable digital signals.

* * * * *